United States Patent
Varkey

(10) Patent No.: US 7,009,113 B2
(45) Date of Patent: Mar. 7, 2006

(54) HIGH TEMPERATURE ELECTRICAL CABLE HAVING INTERSTITIAL FILLER

(75) Inventor: Joseph P. Varkey, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/463,271

(22) Filed: Jun. 17, 2003

(65) Prior Publication Data

US 2004/0140119 A1 Jul. 22, 2004

Related U.S. Application Data

(60) Provisional application No. 60/441,665, filed on Jan. 22, 2003.

(51) Int. Cl.
*H01B 7/18* (2006.01)
*H01B 7/00* (2006.01)

(52) U.S. Cl. .............. 174/102 R; 174/108; 174/110 R; 174/113 R

(58) Field of Classification Search ............ 174/102 R, 174/102 C, 103, 106 R, 107, 108, 110 R, 174/110 S, 113 R, 116
See application file for complete search history.

(56) References Cited

U.S. PATENT DOCUMENTS

| | | | |
|---|---|---|---|
| 2,953,627 A * | 9/1960 | Malneritch et al. ..... | 174/102 R |
| 3,560,631 A | 2/1971 | Rhoades et al. | |
| 3,602,632 A * | 8/1971 | Ollis ........................... | 174/36 |
| 3,773,109 A * | 11/1973 | Eberline .................. | 340/855.1 |
| 3,784,732 A * | 1/1974 | Whitfill, Jr. ................. | 174/108 |
| 4,365,865 A | 12/1982 | Stiles | |
| 4,440,974 A * | 4/1984 | Naudet ........................ | 174/108 |
| 4,449,013 A | 5/1984 | Garschick | |
| 4,719,320 A | 1/1988 | Strait, Jr. | |
| 5,195,158 A | 3/1993 | Bottoms, Jr. et al. | |
| 5,204,926 A | 4/1993 | Bottoms, Jr. et al. | |
| 5,274,725 A | 12/1993 | Bottoms, Jr. et al. | |
| 5,426,264 A * | 6/1995 | Livingston et al. ..... | 174/102 R |
| 5,495,546 A | 2/1996 | Bottoms, Jr. et al. | |
| 5,495,547 A * | 2/1996 | Rafie et al. ................. | 385/101 |
| 5,687,271 A | 11/1997 | Rabinowitz | |
| 5,917,154 A * | 6/1999 | Mortier ................. | 174/117 FF |
| 6,060,662 A * | 5/2000 | Rafie et al. ............. | 174/106 R |
| 6,195,488 B1 | 2/2001 | Song | |
| 6,331,509 B1 * | 12/2001 | Heimann et al. ........... | 508/136 |
| 6,600,108 B1 * | 7/2003 | Mydur et al. ........... | 174/120 R |

FOREIGN PATENT DOCUMENTS

EP          0 352 869 A2 *  1/1990

(Continued)

OTHER PUBLICATIONS

DWS Supplied Conductive Slickline, New Development 31MO Special Alloy, Danum Well Services Ltd., Jun. 1, 2001, 2 pages.
DATALINE, Rochester Stock Type 1-H-185D, No. A219190, Eastern Oil Tools, undated, 1 page.

(Continued)

*Primary Examiner*—William H. Mayo, III
(74) *Attorney, Agent, or Firm*—David Cate; Wayne Kanak; Robin Nava

(57) ABSTRACT

A cable includes a central insulated conductor with a plurality of outer insulated conductors disposed around the central conductor. Interstices formed between the central conductor and outer conductors are at least partially filled with a filler material. Filler materials suitable for high temperature use are included. A jacket encases the filler material and the central and outer conductors. In some embodiments a yarn strand is disposed in the interstices.

15 Claims, 7 Drawing Sheets

FOREIGN PATENT DOCUMENTS

| | | | |
|---|---|---|---|
| EP | 1065674 | A2 | 1/2001 |
| GB | 2 368 921 | A * | 5/2002 |
| JP | 2-250207 | A1 * | 10/1990 |
| JP | 2-270218 | A1 * | 11/1990 |
| WO | WO 99/48111 | | 9/1999 |

OTHER PUBLICATIONS

Product Information, 16" Incoloy Line (0.049" wall) Logging & Well Monitoring Line, Shell Line LLC, Calgary, Canada, Jun. 12, 2000, 1 page.

* cited by examiner

HIGH TEMPERATURE ELECTRICAL CABLE HAVING INTERSTITIAL FILLER

CROSS-REFERENCE TO RELATED APPLICATIONS

This application claims from Provisional Application No. 60/441,665, filed Jan. 22, 2003, which is incorporated herein by reference.

BACKGROUND OF THE INVENTION

1. Field of the Invention

This invention relates to electrical cables and, in particular, to a high temperature electrical cable having an interstitial filler.

2. Description of Related Art

Electrical cables, such as wireline cables used in the oilfield industry, can often be subjected to temperatures exceeding 500° F. (260° C.), pressures exceeding 25,000 pounds per square inch (17.578 million kg/m$^2$), and a wide range of destructive chemicals. Such extreme conditions have led to the design of electrical cables having conductors encased in insulating materials such as perfluoroalkoxy (PFA) polymers, polytetrafluoroethylene (PTFE), and polyimide polymers. Generally, such cables, for example a cable 100 shown in FIG. 1, include a central conductor 102 and a plurality of outer conductors 104 (only one indicated for clarity) arranged in a helical fashion surrounding the central conductor 102. In some such electrical cables, a tetrafluoroethylene (TFE) yarn 106 is disposed in interstices 108 between the outer conductors 104 to improve the roundness of the cable 100. Further, a braided tetrafluoroethylene sleeve 110 is disposed over the conductors 102, 104 and yarn fillers 106. Armor wire 112 is then wrapped over the braided tetrafluoroethylene sleeve 110 to give the cable 100 its desired breaking strength.

Such electrical cables have been found to have several shortcomings. As conventional high temperature cables lack fillers in interstices 114 between the central conductor 102 and the outer conductors 104, the insulation (e.g., the tetrafluoroethylene sleeve 110) surrounding the conductors 102, 104 can become deformed under high pressures, which can lead to electrical shorts and cable failures. High operating temperatures and forces coupled with high pressures can cause the conductor insulation to deform into the unfilled interstices 114, which can also lead to electrical shorts and cable failures. Manufacturing tetrafluoroethylene braiding can be time consuming and expensive. Tetrafluoroethylene yarns used in the braided sleeve 110 and as interstitial fillers can compress under pressure, creating additional voids into which conductor insulation may deform.

Further, as conventional cables are placed under axial tension and compression, the tetrafluoroethylene yarns in the braided sleeve 110 can act as a cutting device. This action can damage the insulation on conductors and lead to electrical shorts and failures. Applying armor wire 112 directly to tetrafluoroethylene sleeve 110 can result in improper seating of the armor wire 112, as the interstitial yarns 106 may not be held in place securely. Improperly seated armor wires 112 may cut into or otherwise damage components within the cable 100 itself.

The present invention is directed to overcoming, or at least reducing, the effects of one or more of the problems set forth above.

BRIEF SUMMARY OF THE INVENTION

In one aspect, the present invention provides an electrical cable. The electrical cable includes a central insulated conductor and a plurality of outer insulated conductors disposed around the central insulated conductor, the central insulated conductor and the plurality of outer insulated conductors forming interstices therebetween. Further, the electrical cable includes a filler material substantially filling at least a portion of the interstices and a jacket encasing the conductors and the filler material.

In another aspect, the present invention provides an electrical cable that includes a central insulated conductor and a plurality of outer insulated conductors disposed around the central insulated conductor, the central insulated conductor and the plurality of outer insulated conductors forming a first set of interstices therebetween, and the plurality of outer insulated conductors forming a second set of interstices therebetween. The electrical cable further includes a filler material substantially filling at least a portion of the first set of interstices and at least a portion of the second set of interstices and a jacket encasing the conductors and the filler material.

In yet another aspect, the present invention includes an electrical cable. The electrical cable includes a central insulated conductor and a plurality of outer insulated conductors disposed around the central insulated conductor, the central insulated conductor and the plurality of outer insulated conductors forming a first set of interstices therebetween and the plurality of outer insulated conductors forming a second set of interstices therebetween. The electrical cable further includes a yarn strand disposed in at least one of the second set of interstices, a filler material substantially filling at least a portion of the first set of interstices and substantially filling at least a portion of the second set of interstices around the yarn, and a tape layer encasing the conductors, the yarn, and the filler material.

In another aspect of the present invention, an electrical cable is provided including a central insulated conductor and a plurality of outer insulated conductors disposed around the central insulated conductor, the central insulated conductor and the plurality of outer insulated conductors forming a first set of interstices therebetween and the plurality of outer insulated conductors forming a second set of interstices therebetween. The electrical cable further includes a yarn strand disposed in at least one of the second set of interstices, a filler material substantially filling at least a portion of the first set of interstices and substantially filling at least a portion of the second set of interstices around the yarn, a tape layer encasing the conductors, the yarn, and the filler material, and a jacket disposed on the tape layer.

BRIEF DESCRIPTION OF THE DRAWINGS

The invention may be understood by reference to the following description taken in conjunction with the accompanying drawings, in which the leftmost significant digit in the reference numerals denotes the first figure in which the respective reference numerals appear, and in which.

Figure 1:
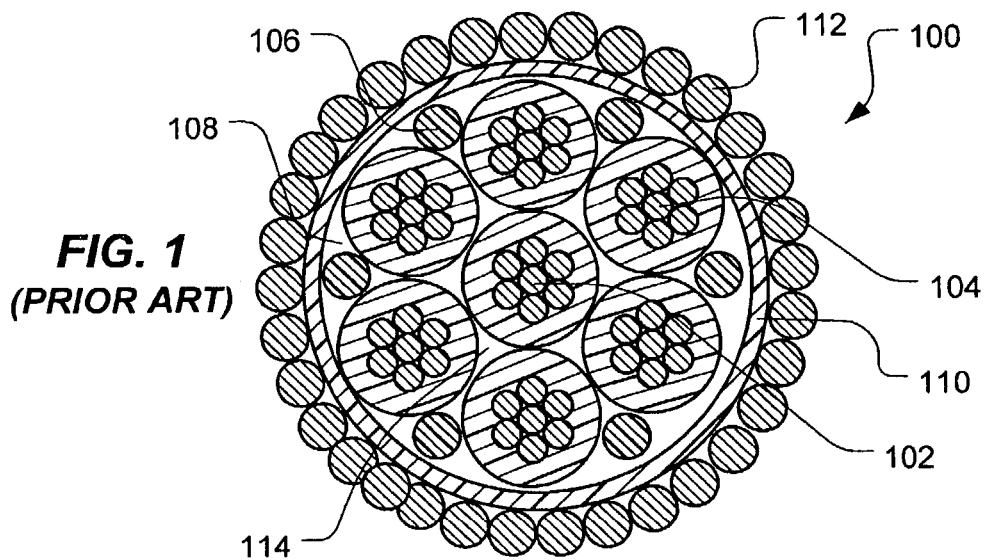
FIG. 1 is a cross-sectional view of a conventional cable.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will be appreciated that in the development of any such actual embodiment numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
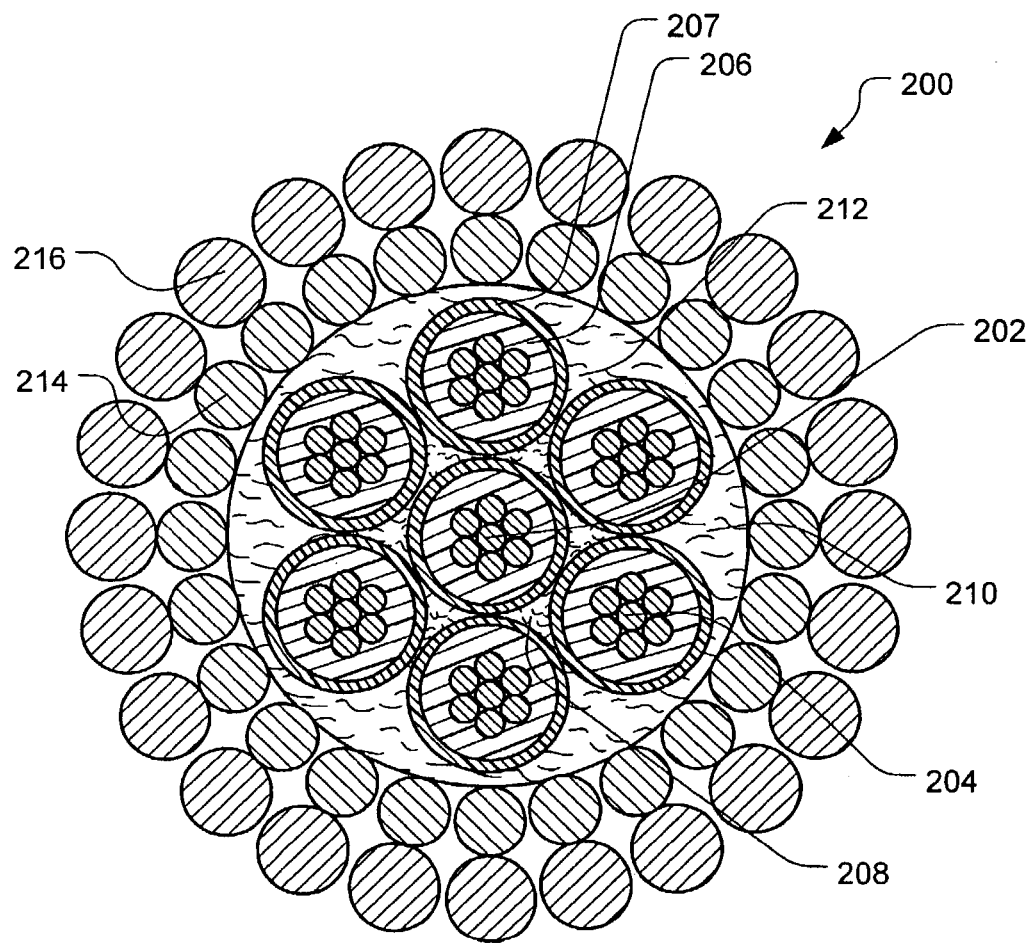
FIG. 2 is a cross-sectional view of a first illustrative embodiment of an electrical cable according to the present invention.

FIG. 2 depicts a first illustrative embodiment of an electrical cable according to the present invention. An electrical cable 200 includes a central conductor 202 and a plurality of outer conductors 204 (only one labeled for clarity) disposed around the central conductor 202. While FIG. 2 illustrates the cable 200 including a central conductor 202 and six outer conductors 204, the present invention is not so limited. Rather, the cable 200 may include any chosen number and size of conductors 202, 204.

In the illustrated embodiment, each of the conductors 202, 204 is encased in a jacket 206 comprising a perfluoroalkoxy polymer, polytetrafluoroethylene, or a polyimide polymer to electrically insulate the conductors 202, 204 from surrounding structures. In one embodiment, a layer 207 of polyetheretherketone (PEEK) or polyetherketone (PEK) may encase the jacketed conductors 202, 204 to further protect the conductors 202, 204.

In the embodiment illustrated in FIG. 2, at least a portion of interstices 208 (only one labeled for clarity) formed between the central conductor 202 and the outer conductors 204 are substantially filled with a filler material, such as a ceramic putty (e.g., Rescor™ 901 manufactured by Cotronics Corporation of Brooklyn, N.Y., U.S.A.), a fluoroelastomer (e.g., SIFEL™ manufactured by Shin-Etsu MicroSi, Inc. of Phoenix, Ariz., U.S.A.), and/or a fluorinated grease or oil (e.g., Krytox® grease or oil manufactured by E. I. duPont de Nemours, Inc. of Wilmington, Del., U.S.A.). Generally, ceramic putties can be pumped into the interstices 208 during manufacturing and may be held in place with tape or may be coated over the central conductor 202, and when cabled fills the interstices 208 as it is still moldable at room temperature. Such putties are generally resistant to chemicals encountered in wireline operations, are electrically insulating, and can withstand temperatures over about 3600° F. (1980° C.).

Generally, uncured liquid fluoroelastomers readily flow into and can be used to substantially fill at least a portion of the interstices 208 during cable manufacture. Once cured, such fluoroelastomers are highly resistant to chemicals encountered in wireline operations and are generally resistant to temperature-related creep. In various embodiments, high temperature oils and fillers, such as oils like Krytox® 240AD manufactured by E. I. duPont de Nemours, Inc., and carbon black or silica as fillers, may be added to such fluoroelastomers to reduce cost and/or to enhance the electrical insulating properties of the material or to make the material semi-conductive, which may be desirable in certain applications.

Fluorinated greases and oils are generally insoluble in water, acids, bases, and common organic solvents. Further, they are capable of withstanding temperatures of up to about 650° F. (343° C.). As with the liquid fluoroelastomers, such fluorinated greases and oils readily flow into and can be used to substantially fill at least a portion of the interstices 208 during cable manufacture. In various embodiments, high-temperature oils and fillers, such as oils like Krytox® 240AD, and carbon black or silica as fillers, may be added to such fluorinated greases and oils to reduce cost and/or to make the material semi-conductive, which may be desirable in certain applications.

Still referring to FIG. 2, the illustrative embodiment further includes a jacket 210 encasing the insulated conductors 202, 204 and substantially filling at least a portion of interstices 212 (only one labeled for clarity) between the outer conductors 204. In various embodiments, the jacket 210 may comprise materials such as polyetheretherketone, polyetherketone, a perfluoroalkoxy polymer, or any fluoroelastomer, such as Viton® or Kalrez®, both manufactured by DuPont Dow Elastomers L.L.C. of Wilmington, Del., U.S.A. Inner armor wire 214 (only one labeled for clarity) is wrapped directly onto and surrounding the jacket 210, which provides an improved seating surface for the inner armor wire 214, protects the insulated conductors 202, 204 from pressure-induced damage, and inhibits fluids, such as wellbore fluids, from entering the cable 200. One or more layers of outer armor wire 216 (only one labeled for clarity) may be applied to the layer of inner armor wire 214.

Figure 3:
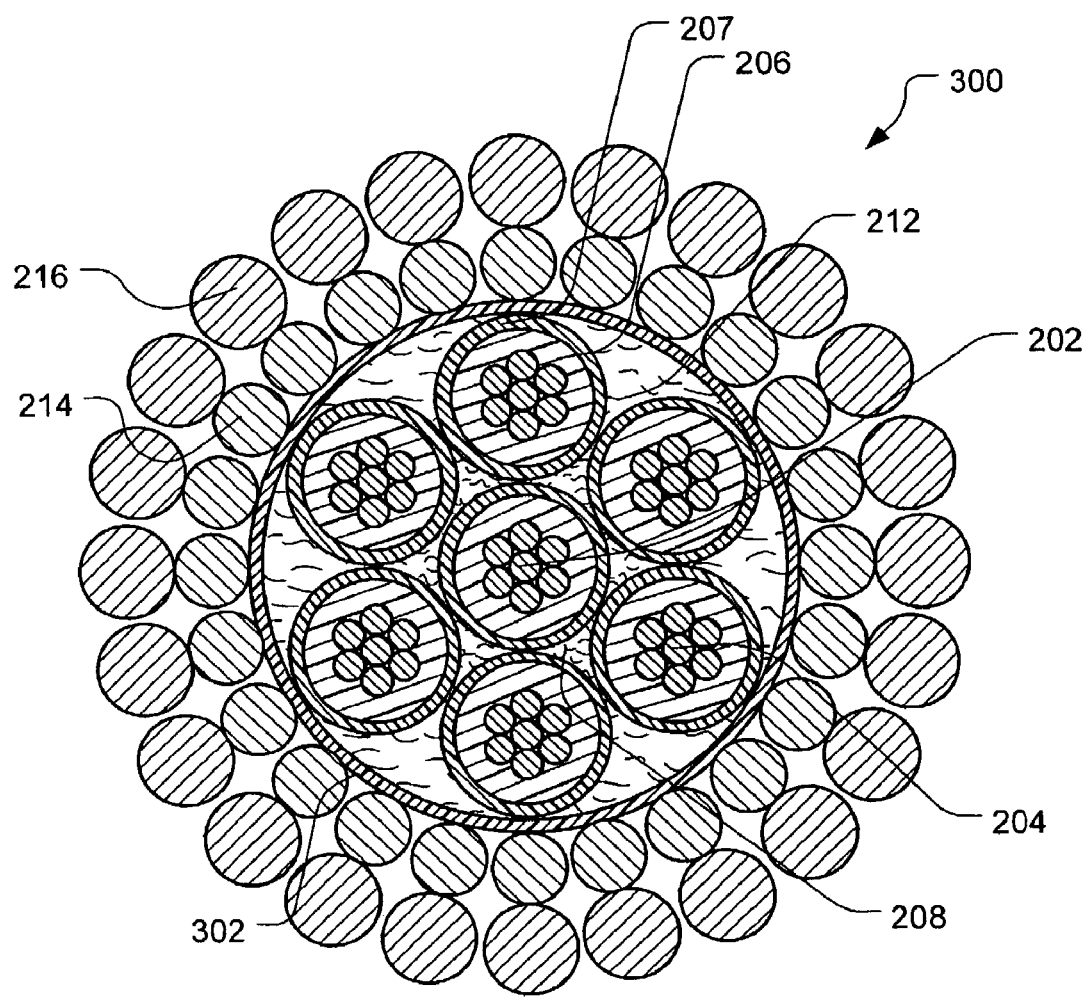
FIG. 3 is a cross-sectional view of a second illustrative embodiment of an electrical cable according to the present invention.

FIG. 3 depicts a second illustrative embodiment of an electrical cable according to the present invention. An electrical cable 300 generally corresponds to the electrical cable 200 (shown in FIG. 2) except that at least a portion of the interstices 208 between the central conductor 202 and the outer conductors 204 and at least a portion of the interstices 212 between the outer conductors 204 are substantially filled with a perfluoroalkoxy polymer. In one embodiment, the perfluoroalkoxy polymer has a low molecular weight corresponding to a melt index greater than about 40. A jacket 302 encases the insulated conductors 202, 204 and the material filling the interstices 208, 212. In various embodiments, the jacket 302 may comprise materials such as polyetheretherketone, polyetherketone, a perfluoroalkoxy polymer, or any fluoroelastomer, such as Viton® or Kalrez®. As in the first illustrative embodiment, the inner armor wires 214 are applied directly to the jacket 302 and one or more layers of outer armor wires 216 may be applied onto the inner armor wires 214.

Figure 4:
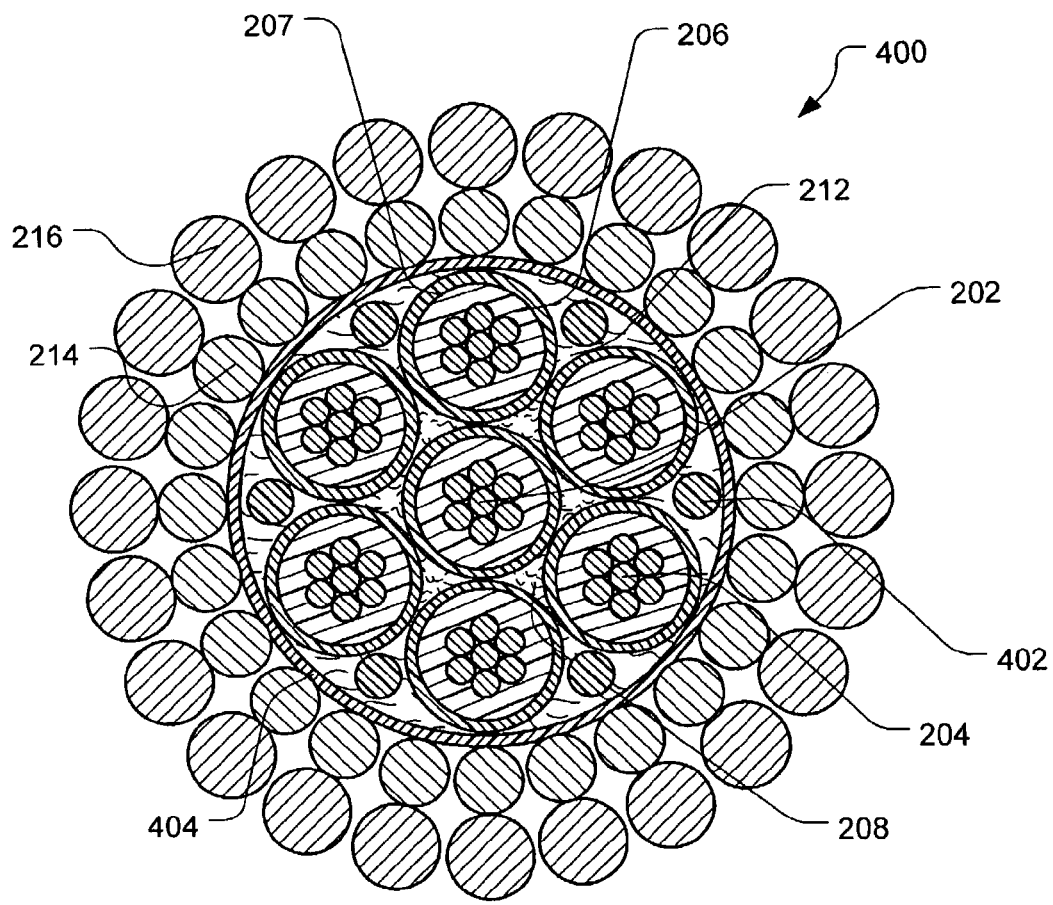
FIG. 4 is a cross-sectional view of a third illustrative embodiment of an electrical cable according to the present invention.

FIG. 4 depicts a third illustrative embodiment of an electrical cable according to the present invention. A cable 400 generally corresponds to the cable 200 (shown in FIG. 2) except that a yarn strand 402 (only one labeled for clarity) is disposed within at least one of the interstices 212 between the insulated outer conductors 204. In one embodiment, the yarn strand 402 comprises tetrafluoroethylene. In the illustrated embodiment, the interstices 208 and at least a portion of the remaining space within the interstices 212 is substantially filled with a ceramic putty, a liquid fluoroelastomer, and/or a fluorinated grease or oil, as described above relating to the first embodiment (shown in FIG. 2).

In the embodiment illustrated in FIG. 4, the conductors 202, 204, the one or more yarn strands 402, and the filler material (i.e., the material substantially filling at least a portion of the interstices 208, 212) is wrapped with a tape layer 404, forming a jacket thereon. In accordance with the present invention, the tape layer 404 may have various constructions. In one embodiment, the tape layer 404 comprises glass fibers coated with polytetrafluoroethylene. In another embodiment, the tape layer 404 comprises polyetheretherketone in the form of a film tape, a woven fiber tape, or a non-woven fiber tape. In yet another embodiment, the tape layer 404 may comprise polyphenylene sulfide in the form of a film tape, a woven fiber tape, or a non-woven fiber tape.

Figure 5:
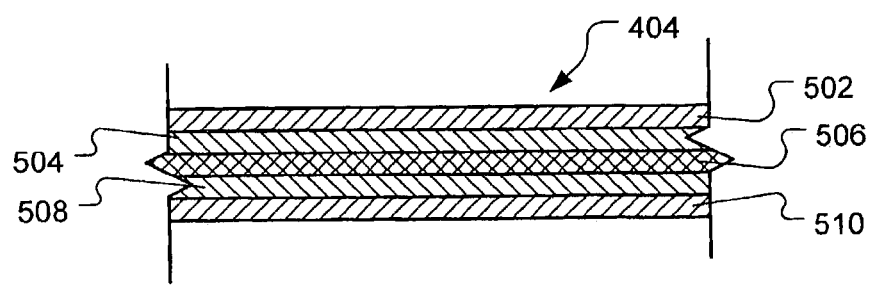
FIG. 5 is a cross-sectional view of an illustrative embodiment of the tape layer of FIG. 4.

As shown in cross-section in FIG. 5, the tape layer 404 may also comprise a polyphenylene sulfide polymer/glass fiber combination. In this embodiment, the tape layer 404 comprises a first polyphenylene sulfide layer 502, a first silicone or other adhesive layer 504, a glass fiber layer 506, a second silicone or other adhesive layer 508, and a second polyphenylene sulfide layer 510. Referring again to FIG. 4, the inner armor wires 214 are applied directly to the tape layer 404 and one or more layers of outer armor wires 216 may be applied onto the inner armor wires 214. In any of the various constructions of the tape layer 404 disclosed herein, the tape layer 404 may be bonded to the filler material (i.e., the material substantially filling at least a portion of the interstices 208, 212) with an adhesive, such as a polymer that is compatible with the interstitial filler material and the tape polymer.

Figure 6:
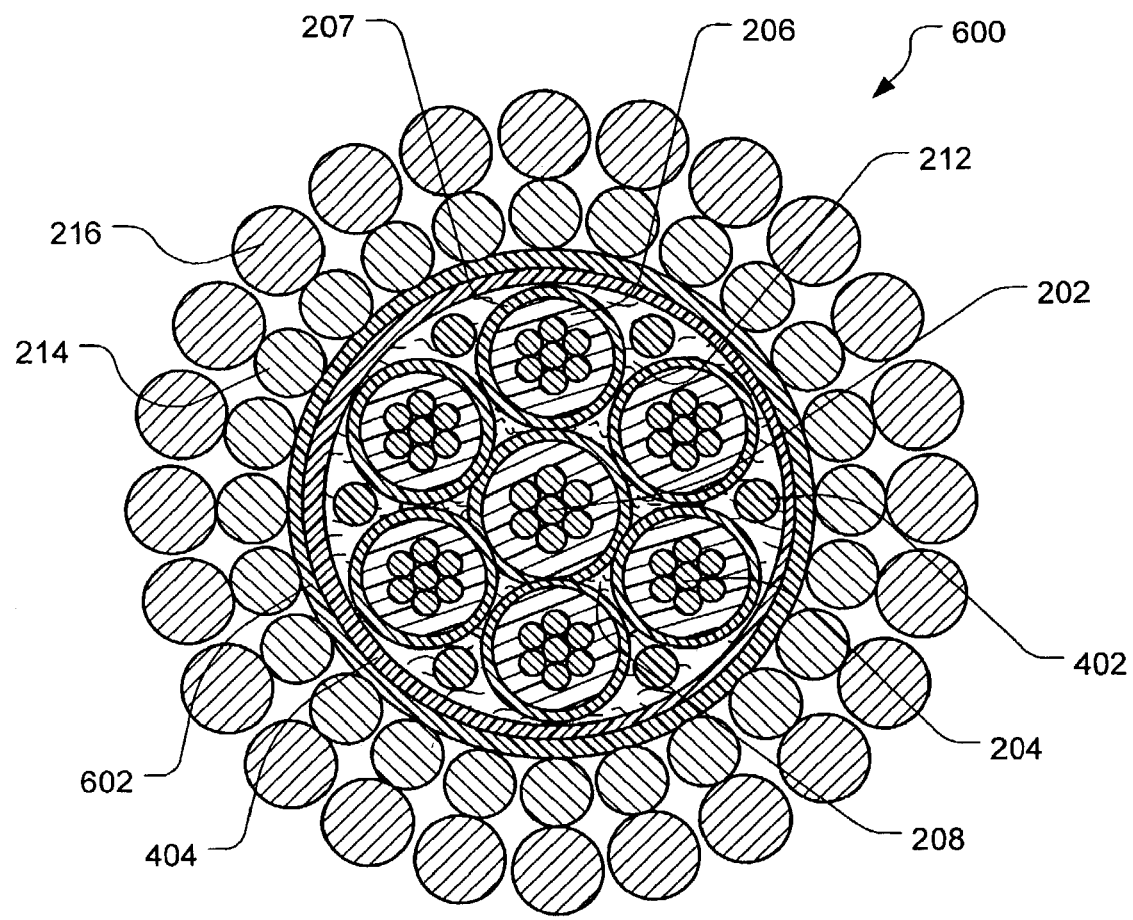
FIG. 6 is a cross-sectional view of a fourth illustrative embodiment of an electrical cable according to the present invention.

FIG. 6 depicts a fourth illustrative embodiment of an electrical cable according to the present invention. An electrical cable 600 generally corresponds to the electrical cable 400, except that a jacket 602 has been added between the tape layer 404 and the inner armor wires 214. In various embodiments, the jacket 602 may comprise polyetheretherketone or polyetherketone. As shown in FIG. 6, the inner armor wires 214 are applied directly to the jacket 602 and one or more layers of outer armor wires 216 may be applied to the inner armor wires 214.

Figure 7A:
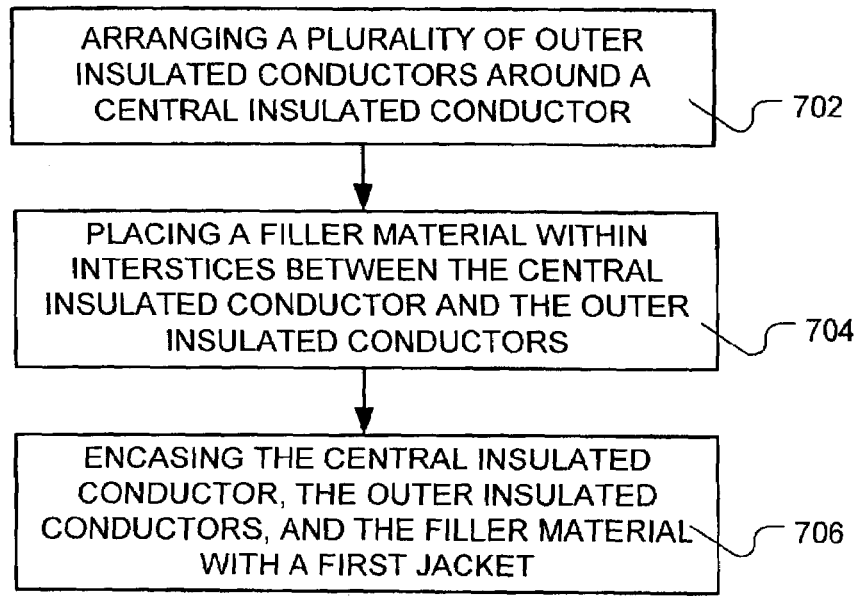
FIGS. 7A–7E are flow diagrams of various embodiments of a method for making an electrical cable according to the present invention.

FIGS. 7A–7E depict various illustrative embodiments of a method for making an electrical cable according to the present invention. As shown in FIG. 7A, a first illustrative embodiment of such a method includes arranging a plurality of outer insulated conductors around a central insulated conductor (block 702) and placing a filler material within interstices between the central insulated conductor and the outer insulated conductors (block 704). Further, the method includes encasing the central insulated conductor, the outer insulated conductors, and the filler material with a first jacket (block 706).

Figure 7B:
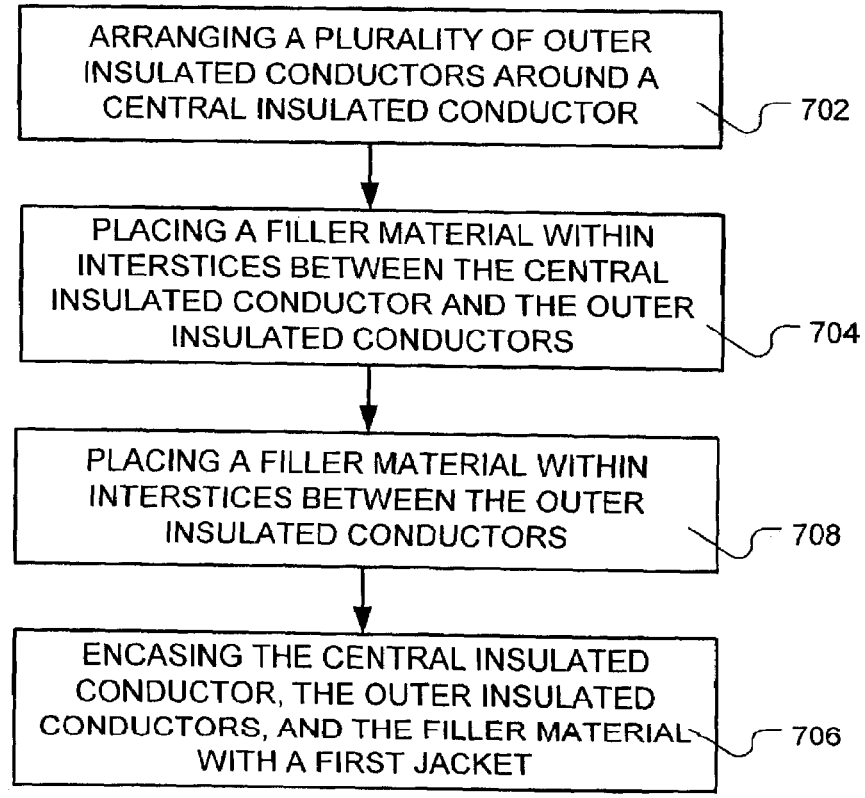

FIG. 7B depicts a second illustrative embodiment of a method for making an electrical cable according to the present invention. The illustrated embodiment generally corresponds to the embodiment of FIG. 7A, except that the method further includes placing a filler material within interstices between the outer insulated conductors (block 708).

Figure 7C:
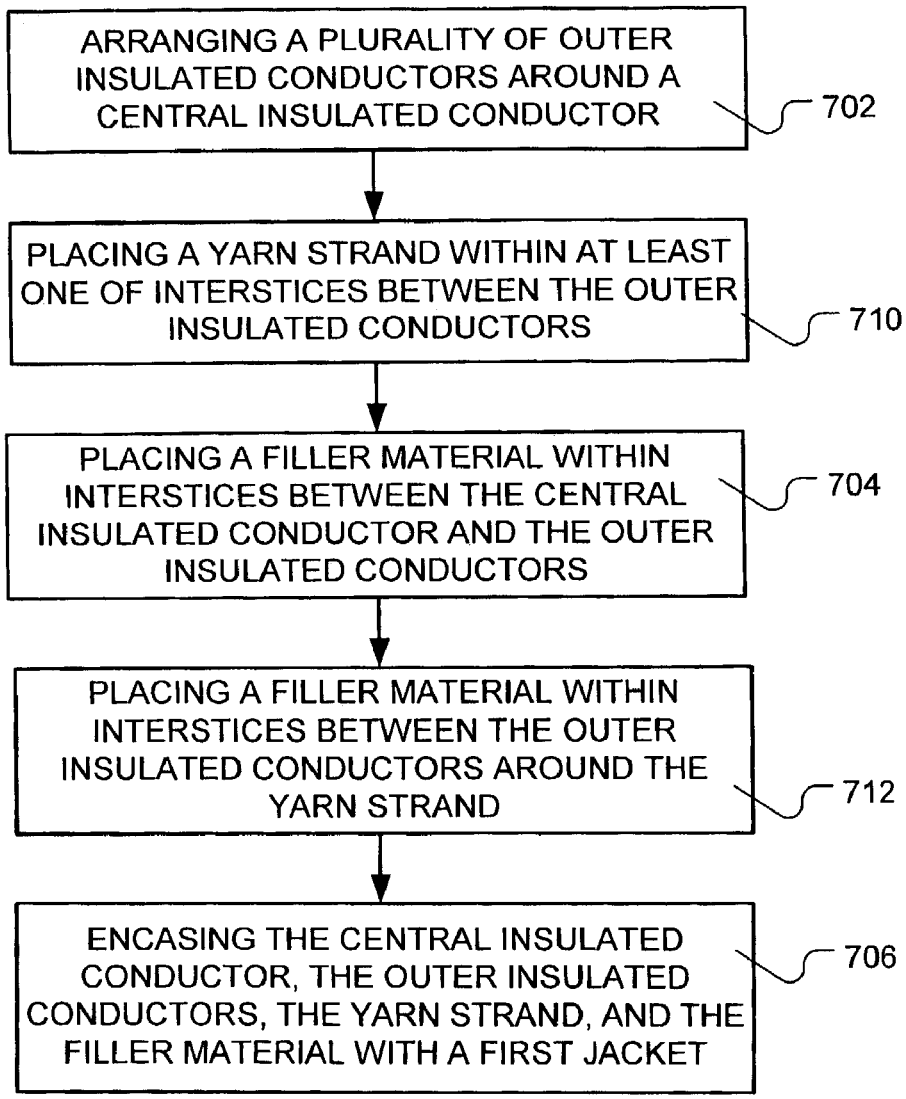

FIG. 7C depicts a third illustrative embodiment of a method for making an electrical cable according to the present invention. The illustrated embodiment generally corresponds to the embodiment of FIG. 7A, except that the method further includes placing a yarn strand within at least one of interstices between the outer insulated conductors (block 710) and placing a filler material within the interstices between the outer insulated conductors around the yarn strand (block 712).

Figure 7D:
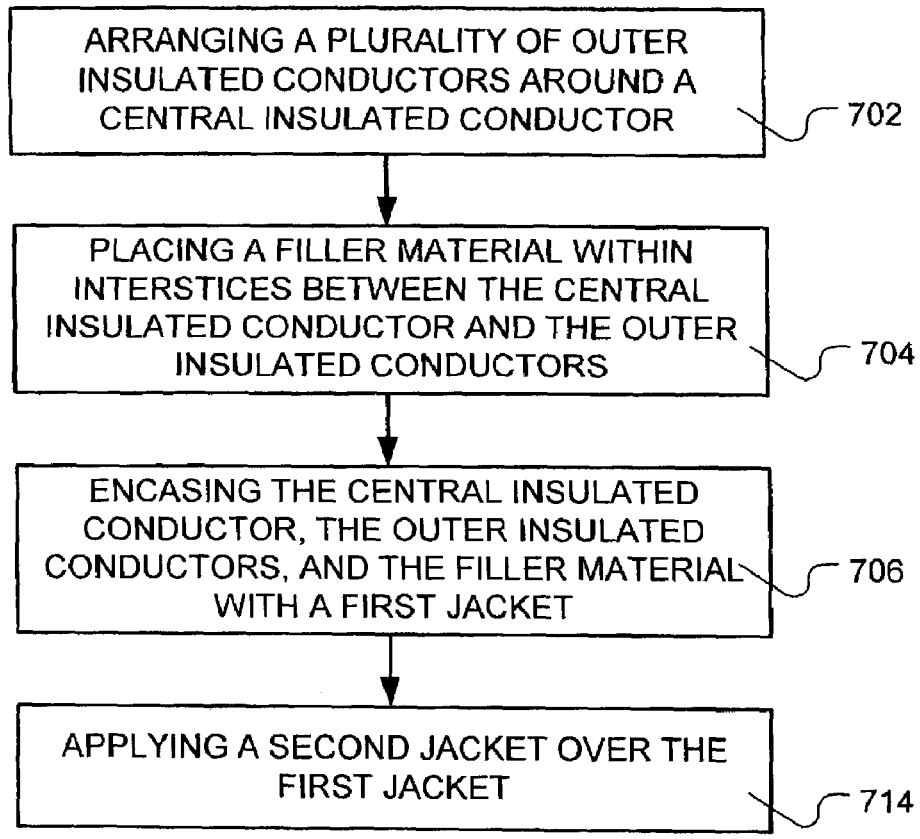

FIG. 7D depicts a fourth illustrative embodiment of a method for making an electrical cable according to the present invention. The illustrated embodiment generally corresponds to the embodiment of FIG. 7A, except that the method further includes applying a second jacket over the first jacket (block 714).

Figure 7E:
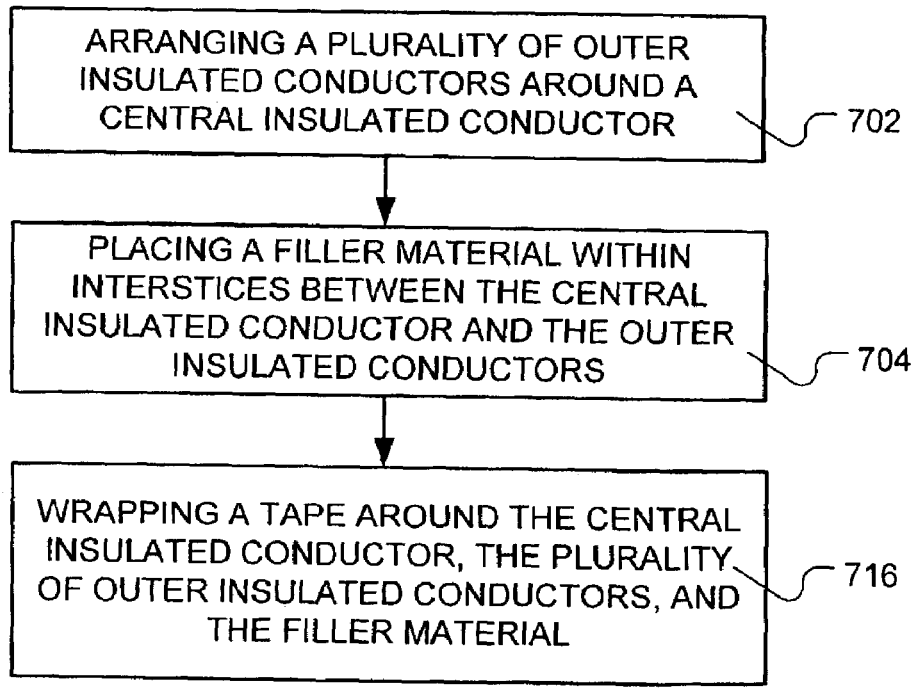

FIG. 7E depicts a fifth illustrative embodiment of a method for making an electrical cable according to the present invention. The illustrated embodiment generally corresponds to the embodiment of FIG. 7A, except that encasing the central insulated conductor (block 706 of FIG. 7A) further comprises wrapping a tape around the central insulated conductor, the plurality of outer insulated conductors, and the filler material (block 716).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An electrical cable, comprising:
   a central insulated conductor;
   a plurality of outer insulated conductors disposed around the central insulated conductor, the central insulated conductor and the plurality of outer insulated conductors forming a first set of interstices therebetween and the plurality of outer insulated conductors forming a second set of interstices therebetween;
   a yarn strand disposed in at least one of the second set of interstices;
   a filler material substantially filling at least a portion of the first set of interstices and substantially filling at least a portion of the second set of interstices around the yarn, wherein the filler material is electrically non-conductive and comprises at least one of a ceramic putty, a fluoroelastomer, a fluorinated grease, and a fluorinated oil;
   a tape layer encasing the central insulated conductor, the plurality of outer insulated conductors, the yarn, and the filler material; and
   a jacket disposed on the tape layer.

2. An electrical cable, according to claim 1, wherein at least one of the central insulated conductor and the plurality of outer insulated conductors comprises an electrical conductor and a first polymeric layer disposed thereon comprising one of a perfluoroalkoxy polymer, polytetrafluoroethylene, and a polyimide polymer.

3. An electrical cable, according to claim 2, wherein the at least one of the central insulated conductor and the plurality of outer insulated conductors comprises a second polymeric layer disposed on the first polymeric layer comprising one of polyetheretherketone and polyetherketone.

4. An electrical cable, according to claim 1, wherein the filler material further comprises at least one of a high temperature oil and silica.

5. An electrical cable, according to claim 1, wherein the jacket comprises a fluoroelastomer.

6. An electrical cable, according to claim 1, wherein the jacket comprises perfluoroalkoxy polymer.

7. An electrical cable, according to claim 1, further comprising a layer of armor wire disposed on the jacket.

8. An electrical cable, according to claim 1, wherein the filler material comprises a perfluoroalkoxy polymer having a melt index of greater than about 40.

9. An electrical cable, according to claim 1, wherein the yarn strand comprises tetrafluoroethylene.

10. An electrical cable, according to claim 1, wherein the tape layer comprises glass fibers coated with a polytetrafluoroethylene polymer.

11. An electrical cable, according to claim 1, wherein the tape layer comprises one of a polyetheretherketone film, a polyetheretherketone woven fiber tape, and a polyetheretherketone non-woven fiber tape.

12. An electrical cable, according to claim 1, wherein the tape layer comprises one of a polyphenylene sulfide film, a polyphenylene sulfide woven fiber tape, and a polyphenylene sulfide non-woven fiber tape.

13. An electrical cable, according to claim 1, wherein the tape layer comprises:
- a first polyphenylene sulfide layer;
- a first silicone or other adhesive layer disposed on the first polyphenylene sulfide layer;
- a glass fiber layer disposed on the first silicone or other adhesive layer;
- a second silicone or other adhesive layer disposed on the glass fiber layer; and
- a second polyphenylene sulfide layer disposed on the second silicone or other adhesive layer.

14. An electrical cable, according to claim 1, further comprising an adhesive layer disposed between the tape layer and the filler material.

15. An electrical cable, according to claim 1, wherein the jacket comprises one of polyetheretherketone and polyetherketone.

* * * * *